(12) United States Patent
Yamakawa

(10) Patent No.: US 6,513,695 B2
(45) Date of Patent: Feb. 4, 2003

(54) TERMINAL PRESSURE-WELDING APPARATUS

(75) Inventor: Nobuaki Yamakawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/781,997

(22) Filed: Feb. 14, 2001

(65) Prior Publication Data

US 2001/0015366 A1 Aug. 23, 2001

(30) Foreign Application Priority Data

Feb. 18, 2000 (JP) ........................................ 2000-041012

(51) Int. Cl.⁷ ................................................ B23K 20/00
(52) U.S. Cl. ........................ 228/3.1; 228/4.1; 228/44.3; 228/115
(58) Field of Search ........................ 228/3.1, 4.1, 44.3, 228/115

(56) References Cited

U.S. PATENT DOCUMENTS

| | | | | |
|---|---|---|---|---|
| 2,878,854 A | * | 3/1959 | Batcheller | 29/517 |
| 3,336,655 A | * | 8/1967 | Romus | 228/115 |
| 3,969,806 A | * | 7/1976 | McCaughey | 29/515 |
| 4,480,385 A | * | 11/1984 | Dragisic | 29/753 |
| 5,147,085 A | * | 9/1992 | Hawkes et al. | 228/115 |
| 5,390,410 A | * | 2/1995 | Takenami et al. | 29/753 |
| 5,414,926 A | * | 5/1995 | Ito et al. | 29/753 |
| 5,415,562 A | * | 5/1995 | Matsumoto et al. | 439/397 |
| 5,484,961 A | * | 1/1996 | Itoh et al. | 174/84 C |
| 5,500,999 A | * | 3/1996 | Yagi et al. | 29/751 |
| 5,581,879 A | * | 12/1996 | Tsuji et al. | 29/33 M |
| 5,661,898 A | * | 9/1997 | Matsuzawa | 29/33 M |
| 5,669,257 A | * | 9/1997 | Inoue et al. | 72/20.1 |
| 5,774,977 A | * | 7/1998 | Folk et al. | 29/753 |
| 5,967,399 A | * | 10/1999 | Takada | 228/101 |
| 6,102,276 A | * | 8/2000 | Takada | 228/115 |
| 6,193,138 B1 | * | 2/2001 | Wada | 228/115 |

FOREIGN PATENT DOCUMENTS

| | | |
|---|---|---|
| JP | 8-111275 | 4/1996 |
| JP | 8-162248 | 6/1996 |

\* cited by examiner

*Primary Examiner*—Tom Dunn
*Assistant Examiner*—Zidia Pittman
(74) *Attorney, Agent, or Firm*—Armstrong, Westerman & Hattori, LLP

(57) ABSTRACT

A terminal pressure-welding apparatus is provided, which includes: a first pattern; a second pattern facing the first pattern, one of the first and second patterns is provided approachably and disapproachably with respect to the other thereof; a mounting portion to mount the other of the first and second patterns; a displacing member carrying the one of the first and second patterns and being movable relatively to the other of the first and second patterns; and a stopping means to check an abutment of the first pattern and the second pattern, wherein a terminal metal fitting and an end portion of an electric wire are placed between the first and second patterns, and the terminal metal fitting and the end portion are pressure-welded by making the first and second patterns approach each other. The stopping means has a projecting portion projecting from the mounting portion toward the displacing member in order to abut against an end plane of the displacing member thereby to check the abutment of the first and second patterns. The projecting portion has an abutting plane to abut against the end plane, an adjusting means of a distance between the abutting plane and the mounting portion, and a fixing means to secure the projecting portion to the mounting portion for keeping the distance.

3 Claims, 4 Drawing Sheets

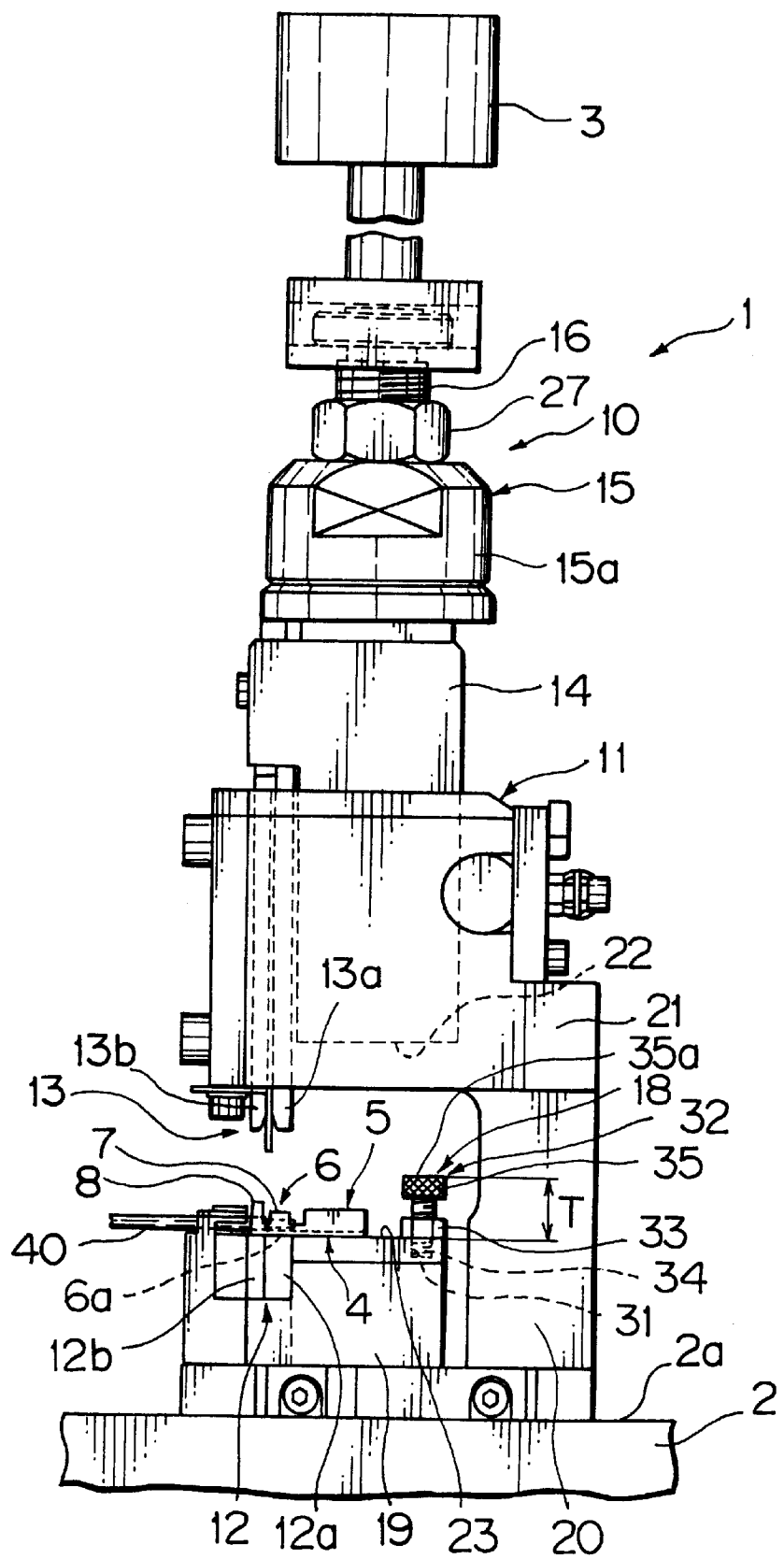
F I G. 2

TERMINAL PRESSURE-WELDING APPARATUS

BACKGROUND OF THE INVENTION

1. Field of the Invention

The present invention relates to a terminal pressure-welding apparatus to pressure-weld an electric wire and a terminal metal fitting.

2. Description of the Related Art

In electrically connecting an electric wire and a terminal metal fitting to each other by crimping, i.e. by pressure-welding, crimping pieces of the terminal metal fitting, for example, a terminal pressure-welding apparatus shown in Japanese Patent Application Laid-open No. 8-111275 or in Japanese Patent Application Laid-open No. 8-162248 is conventionally used.

Each terminal pressure-welding apparatus has an apparatus body secured on the floor or the like of a workshop, a drive source to approach and separate a later-described anvil and a crimper with respect to each other, a pressure-welding device (i.e. applicator) to pressure-weld an electric wire and a terminal metal fitting, and a terminal bundle feeder. The terminal bundle feeder feeds a terminal bundle, i.e. a plurality of terminal metal fittings connected each other, to the above applicator.

The above applicator has a lower pattern (i.e. anvil), an upper pattern (i.e. crimper), a gearing portion, a connecting portion, a terminal feed mechanisms, and so on. The anvil is fixed to the apparatus body or the like. The crimper stands opposite the anvil. The crimper is vertically movable and, in other words, is approachable and disapproachable relative to the anvil.

The gearing portion can go up and down along with the crimper. The connecting portion is connected to the drive source and also is connected with the gearing portion in a state of being capable of changing a relative position.

That is, the connecting portion connects the crimper with the drive source so as to vertically move the crimper. And, a relative position between the connecting portion and the gearing portion being changeable, an interval between the crimper and the anvil can be adjusted.

The terminal feed mechanism feeds a terminal metal fitting one by one to the anvil in accordance with the vertical, i.e. up and down, movement of the crimper.

With this kind of applicator in which the interval between the crimper and the anvil can be adjusted, the electric wires with various thickness can be pressure-welded to the terminal metal fitting.

In pressure-welding the electric wire and the terminal metal fitting by using the above terminal pressure-welding apparatus, first, the terminal feed mechanism of the applicator sends the terminal bundle to place one terminal metal fitting between the crimper and the anvil.

The electric wire is put on the terminal metal fitting positioned between the crimper and the anvil. The drive source makes the crimper and the gearing portion drop through the connecting portion. One terminal metal fitting is separated from the terminal bundle, and the crimper bends the crimping pieces of the terminal metal fitting so as to pressure-weld the electric wire.

With respect to the above prior art terminal pressure-welding apparatus, however, when the size of the terminal metal fitting or the thickness of the electric wire is changed, the applicator has to be changed or the interval between the crimper and the anvil has to be adjusted.

In such an operation, the crimper is likely to over-drop, thereby causing an abutment of the crimper on the anvil.

This abutment would further cause a breakage of the patterns (i.e. the crimper and the anvil) even in preparation work of adjusting a interval between the crimper and the anvil.

SUMMARY OF THE INVENTION

In view of the foregoing, an object of the present invention is to provide a terminal pressure-welding apparatus which can prevent the patterns for pressure-welding an electric wire and a terminal metal fitting from being damaged.

In order to achieve the above object, as a first aspect of the present invention, a terminal pressure-welding apparatus comprises: a first pattern; a second pattern facing the first pattern, one of the first and second patterns is provided approachably and disapproachably with respect to the other thereof; a mounting portion to mount the other of the first and second patterns; a displacing member carrying the one of the first and second patterns and being movable relatively to the mounting portion carrying the other of the first and second patterns; and a stopping means to check an abutment of the first pattern and the second pattern, wherein a terminal metal fitting and an end portion of an electric wire are placed between the first and second patterns, and the terminal metal fitting and the end portion are pressure-welded by making the first and second patterns approach each other.

As a second aspect of the present invention, in the structure with the above first aspect, the stopping means has a projecting portion projecting from the mounting portion toward the displacing member in order to abut against an end plane of the displacing member thereby to check the abutment of the first and second patterns.

As a third aspect of the present invention, in the structure with the above second aspect, the projecting portion has an abutting plane to abut against the end plane, an adjusting means of a distance between the abutting plane and the mounting portion, and a fixing means to secure the projecting portion to the mounting portion for keeping the distance.

According to the above-described structures of the present invention, the following advantages are provided.

(1) Since the stopping means prevents the first pattern and the second pattern from coming into contact with each other, for example in preparing a pressure-welding work, damage of the patterns can be prevented.

(2) Since the projecting portion projects from the mounting portion toward the displacing member, the first pattern and the second pattern can be more securely prevented from coming into contact with each other, damage of the patterns can be more securely prevented.

(3) Even if the interval between the first pattern and the second pattern has to be changed, since the distance between the abutting plane and the mounting portion, the first pattern and the second pattern can be securely prevented from coming into contact with each other, thereby securely preventing damage of the patterns. And, since the fixing means secures the projecting portion to the mounting portion, the distance between the abutting plane and the mounting portion can be prevented from changing unexpectedly, thereby securing the pressure-welding of the electric wire and the terminal metal fitting.

The above and other objects and features of the present invention will become more apparent from the following description taken in conjunction with the accompanying drawings.

BRIEF DESCRIPTION OF THE DRAWINGS

FIG. 2 is a side view showing the terminal pressure-welding apparatus of FIG. 1;

DESCRIPTION OF THE PREFERRED EMBODIMENT(S)

Figure 1:
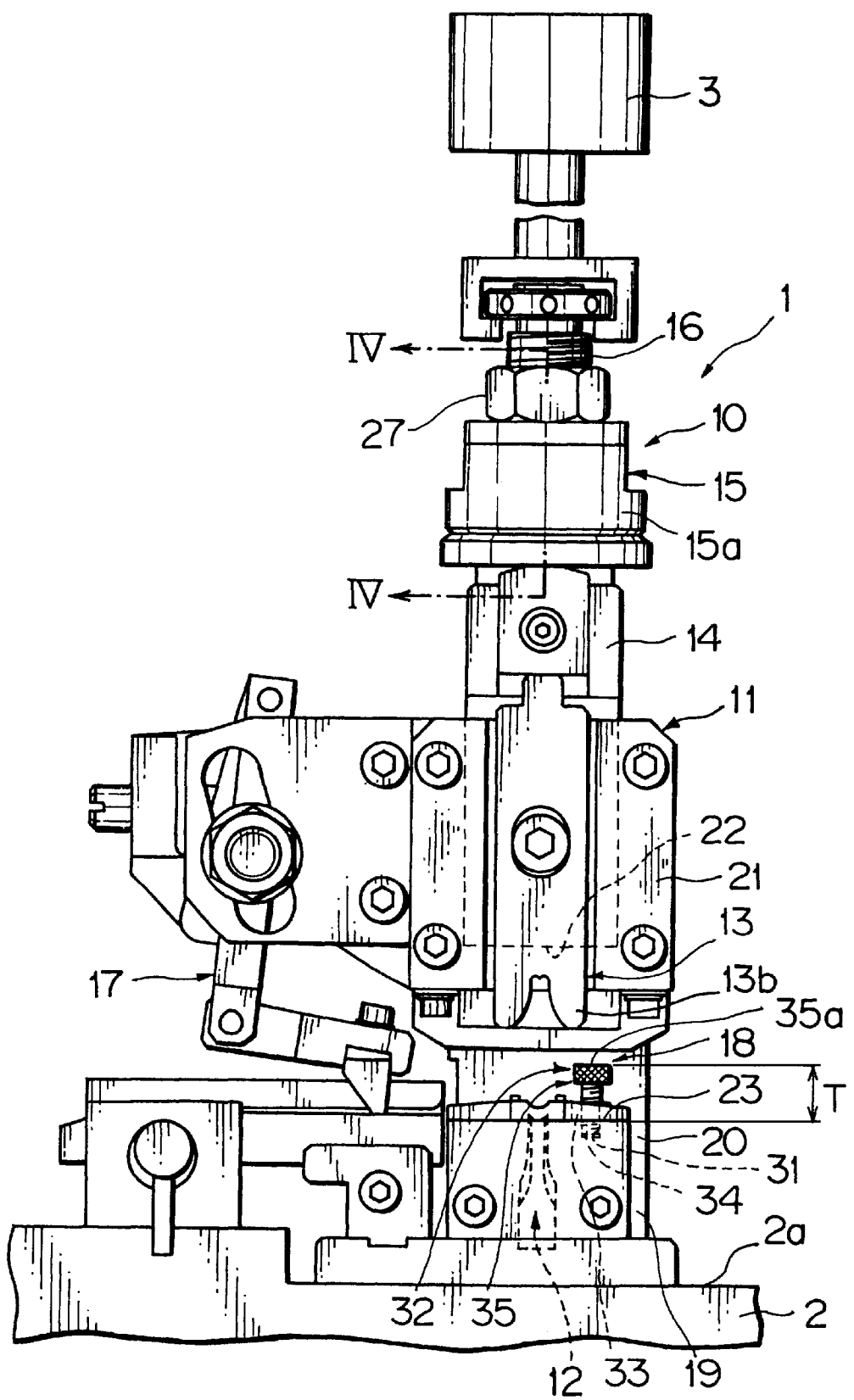
FIG. 1 is a front view showing an embodiment of a terminal pressure-welding apparatus, with an applicator, in accordance with the present invention.

An embodiment of the present invention will now be described in further detail with reference to the accompanying drawings.

An embodiment of a terminal pressure-welding apparatus in accordance with the present invention is described referring to FIG. 1 to FIG. 6. The terminal pressure-welding apparatus 1 pressure-welds a terminal metal fitting 4 (FIG. 2) to an end portion of an electric wire 40 (FIG. 2), or viceversa, that is, an end portion of an electric wire 40 to a terminal metal fitting 4. The terminal metal fitting 4 is formed of a conductive metal plate and has an electrical contacting portion 5 to which a mating terminal metal fitting is connected and a wire connecting portion 6 to which the electric wire 40 is connected.

The wire connecting portion 6 has a bottom wall 6a on which the electric wire 40 is placed, a pair of conductor crimping pieces 7 continuing from respective edges of the bottom wall 6a, and a pair of sheathing crimping pieces 8 also continuing from the respective edges of the bottom wall 6a. The conductor crimping pieces 7 are bent toward the bottom wall 6a so as to crimp or pressure-weld a core wire of the electric wire 40. The sheathing crimping pieces 8 are bent toward the bottom wall 6a so as to crimp or pressure-weld a sheathing portion of the electric wire 40.

Like the above, the wire connecting portion 6 are connected to the electric wire 40, which would be of relatively large diameter one or small diameter one.

The terminal pressure-welding apparatus 1, as shown in FIG. 1 and FIG. 2, has an apparatus body 2 secured on the floor, or the like, of a workshop, a drive source 3, a pressure-welding device 10 (i.e. applicator) to pressure-weld an electric wire 40 and a terminal metal fitting 4, and a non-shown terminal bundle feeder.

The apparatus body 2 has a flat portion 2a being flat in a horizontal direction. The drive source 3 up/down-drives a later-described ram bolt 15 and a shank 16 so as to move a later-described crimper 13 of the applicator 10 relative to a later-described anvil 12.

A motor to rotate a cam, an oil pressure cylinder, and the likes can be used as the drive source 3 to up/down-drive the shank 16.

The terminal bundle feeder feeds a terminal bundle, i.e. a plurality of terminal metal fittings 4 connected each other, to the above applicator 10.

The applicator 10, as shown in FIG. 1 and FIG. 2, has a frame 1, a lower pattern 12 (anvil) as a first pattern, an upper pattern 13 (crimper) as a second pattern, a ram 14 as a displacing member, a ram bolt 15, a shank 16, a terminal feed mechanism 17, and a stopping portion 18 as a stopping means.

The frame 1 is formed in a U-shape and installed on a flat portion 2a of the apparatus body 2. The frame 1 has an anvil holder 19 as a mounting portion, an upward-extending portion 20, and a ram supporting portion 21. The anvil holder 19 is arranged on the flat portion 2a.

The anvil holder 19 holds the anvil 12. The anvil holder 19 has a flat plane 23 facing the crimper 13 and a later-described lower end plane 22 of the ram 14. The flat plane 23 crosses at right angles with a later-described up-and-down direction of the ram 14, that is, an approaching-and-disapproaching direction of the crimper 13 with respect to the anvil 12.

The upward-extending portion 20 extends upward from the anvil holder 19. The ram supporting portion 21 connects to an upper end portion of the upward-extending portion 20. The ram supporting portion 21 supports the ram 14 vertically movably.

The anvil 12 has a first anvil 12a and a second anvil 12b. The first anvil 12a and the second anvil 12b are held by the anvil holder 19. On the anvil 12 the terminal metal fitting 4 is placed with its bottom wall 6a being in contact with the anvil 12.

A portion of conductor crimping pieces 7 of the bottom wall 6a of the wire connecting portion 6 is placed on the first anvil 12a, and a portion of sheathing crimping pieces 8 of the bottom wall 6a of the wire connecting portion 6 is placed on the second anvil 12b. The cramping pieces 7, 8 of the terminal metal fitting 4 laced on the anvil 12 are directed upward.

The ram 14 is formed in a rectangular solid. The ram 14 is supported by the ram supporting portion 21 for vertical movement. The ram 14 has a non-shown screw hole opening upward at an upper end plane.

The lower end plane 22 (end plane) of the ram 14 crosses at right angles with the up-and-down direction of the ram 14. The lower end plane 22 stands opposite the above anvil holder 19. That is, the lower end plane 22 stands opposite the anvil 12.

The crimper 13 is attached to the lower end portion of the ram 14. The crimper 13 stands opposite the anvil 12. The crimper 13 attached to the ram 14 is vertically approachable to and disapproachable from the anvil 12.

The crimper 13 has a first crimper 13a and a second crimper 13b. The first crimper 13a faces the first anvil 12a. The first crimper 13a faces the conductor crimping pieces 7 of the terminal metal fitting 4 arranged on the anvil 12 and moves relative to the conductor crimping pieces 7.

The second crimper 13b faces the second anvil 12b. The second crimper 13b faces the sheathing crimping pieces 8 of the terminal metal fitting 4 arranged on the anvil 12 and moves relative to the sheathing crimping pieces 8.

With the above-described structure, the crimper 13 and the anvil 12 pressure-weld the terminal metal fitting 4 and the end portion of the electric wire 40. At this time, the first crimper 13a bends the conductor crimping pieces 7 toward the bottom wall 6a so as to crimp the core wire of the electric wire 40. The second crimper 13b bends the sheathing crimping pieces 8 toward the bottom wall 6a so as to crimp the sheathing portion of the electric wire 40.

Here, the intervals between the above crimpers 13a, 13b and the anvils 12a, 12b, respectively, can be changed according to the outside diameter of the electric wire 40. For example, in case of pressure-welding the electric wire 40 with a relatively large outside diameter, the above intervals can be adjusted to be relatively large, and in case of pressure-welding the electric wire 40 of a relatively small outside diameter, the above intervals can be adjusted to be relatively small.

The ram bolt 15 is a bolt to be screwed in a screw hole of the ram 14. The ram bolt 15 is provided with a non-shown other screw hole on its head 15a. This screw hole opens upward on an upper end plane of the head 15a. The ram bolt 15 is attached to the ram 14 by being screwed to the above screw hole of the ram 14.

The ram bolt 15 attached to the ram 14 can go up and down along with the ram 14. The shank 16 is formed in a hollow cylindrical shape, and its one end portion is attached to the drive source 3. The shank 16 is provided with a thread portion to be screwed to the above screw hole of the ram bolt 15 at the other end portion thereof. The shank 16 up/down-operates the ram bolt 15, the ram 14 and the crimper 13 by the drive source 3.

The vertical relative position between the shank 16 and the ram bolt 15 can be changed by means of the amount of screwing of the shank 16 against the screw hole of the ram bolt 15. The change of the above vertical relative position between the shank 16 and the ram bolt 15 changes and adjusts the interval between the crimper 13 and the anvil 12.

And, the applicator 10 has a nut 27 screwed to the thread portion of the shank 16. This nut 27 is used to secure the shank 16 to the ram bolt 15.

The terminal feed mechanism 17 feeds a terminal metal fitting one by one on the anvil 12 in accordance with the vertical, i.e. up and down, movement of the crimper 13. That is, the terminal feed mechanism 17 feeds a terminal metal fitting one by one on the anvil 12 in accordance with the pressure-welding work of the terminal metal fitting 4 and the end portion of the electric wire 40.

The stopping portion 18 has a screw hole 31 (an adjusting means), a bolt 32 as a projecting portion, and a nut 33 (a fixing means). The screw hole 31 opens vertically on the flat plane 23.

The bolt 32 has a thread portion 34 (an adjusting means) and a head 35. The head 35 of the bolt 32 upwardly projects from the flat plane 23 of the anvil holder 19 and faces the ram 14. And, the bolt 32 (FIG. 2) adjusts a distance T (hereinafter, interval T) between a later-described end plane 35a thereof and the flat plane 23 of the anvil holder 19 by changing its screwing amount.

Figure 4:
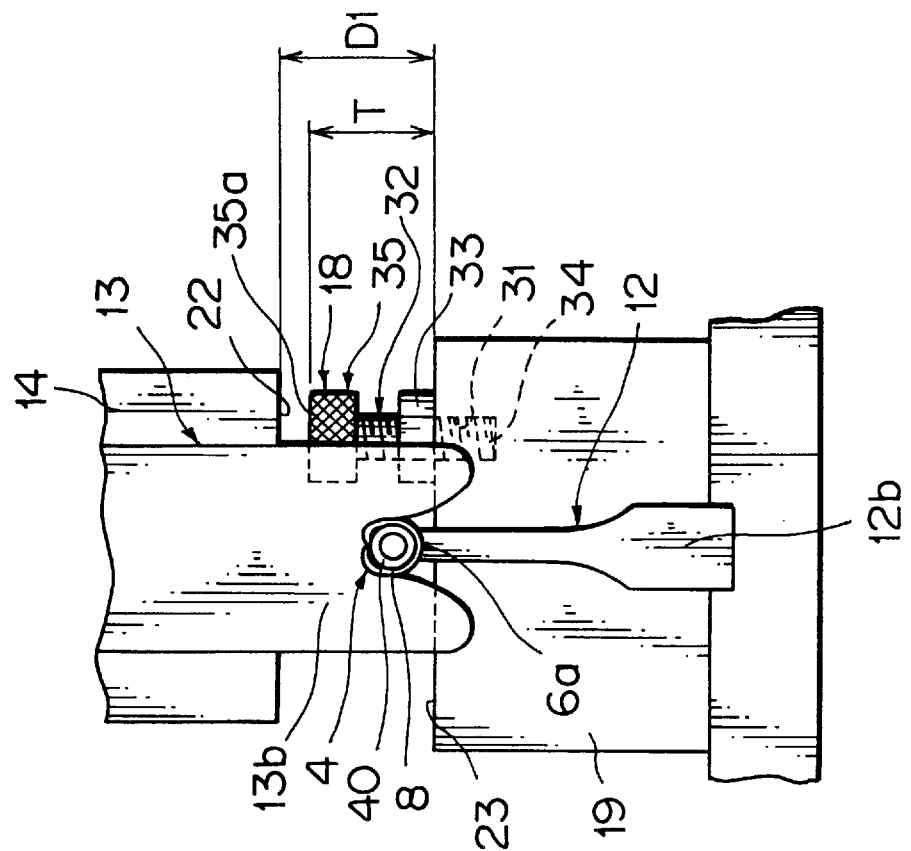
FIG. 4 is a front view partly showing the applicator, wherein the terminal metal fitting and an end portion of the electric wire are pressure-welded with the anvil and a crimper.
Figure 3:
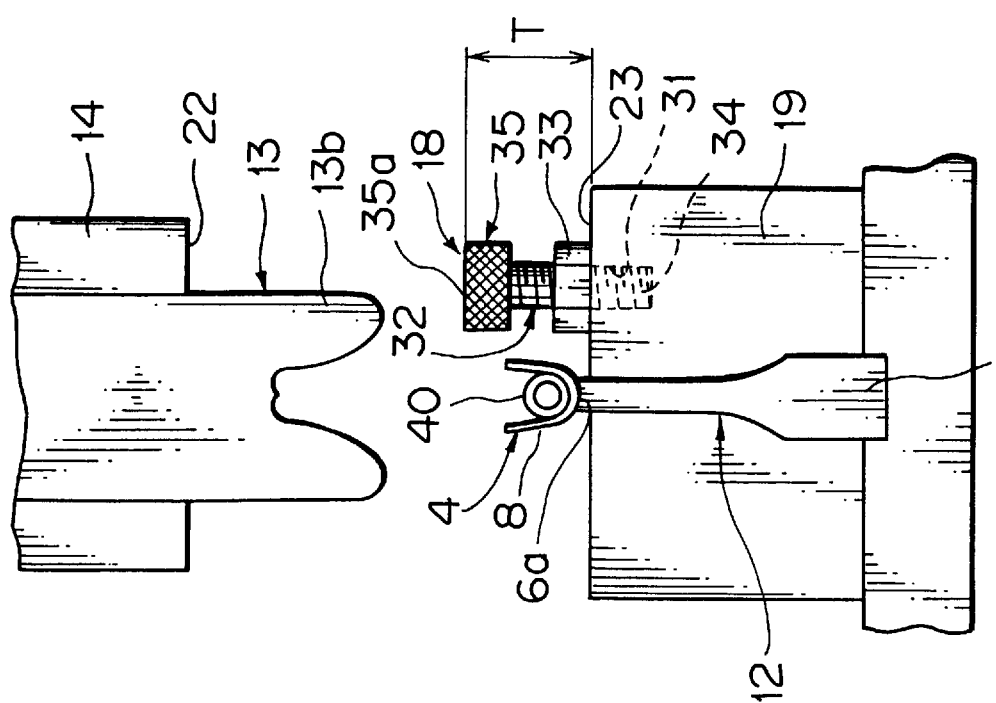
FIG. 3 is a front view partly showing the applicator, wherein a terminal metal fitting and an electric wire is placed on an anvil.
Figure 6:
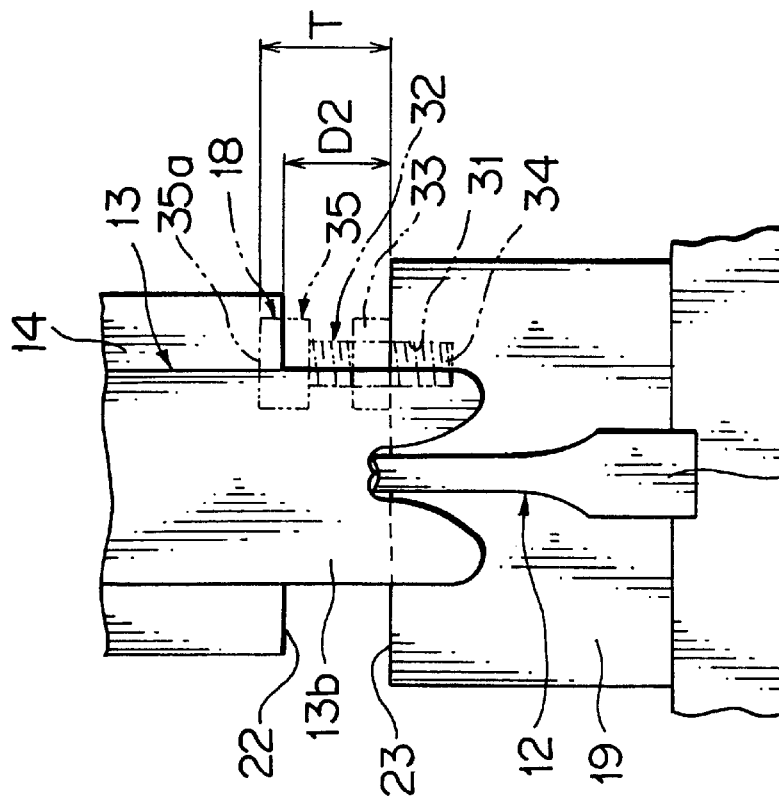
FIG. 6 is a front view partly showing the applicator, wherein the crimper is just in into contact with the anvil.
Figure 5:
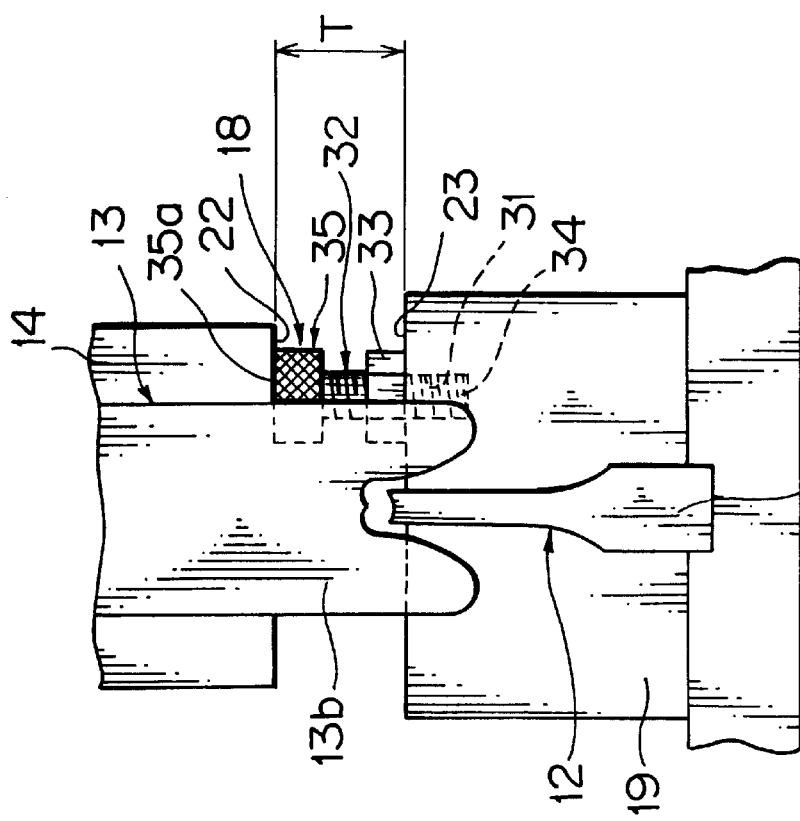
FIG. 5 is a front view partly showing the applicator, wherein a lower end plane of a ram is abutting against an end plane of a bolt.

The end plane 35a (an abutting plane) of the head 35 is formed flatly. The end plane 35a of the bolt 32 stands opposite the lower end plane 22 (FIGS. 3–5). The bolt 32 is screwed in the screw hole 31 in a state of the above interval T (FIGS. 2–6) being between an interval D1 (FIG. 4) and an interval D2 (FIG. 6).

Referring to FIG. 4, the interval D1 is defined as a first interval between the lower end plane 22 and the flat plane 23, wherein the crimper 13 has bent the cramping pieces 7,8, and, that is, the terminal metal fitting 4 and the electric wire 40 have been pressure-welded. Referring to FIG. 6, the interval D2 is defined as a second interval between the lower end plane 22 and the flat plane 23, wherein the crimper 13 is just before the contact with the anvil 12.

When the interval T is larger than the above interval D2 as shown in FIG. 5, the end plane 35a abuts against the lower end plane 22, thereby checking an attack of the crimper 13 against the anvil 12.

The interval T of the above bolt 32 may be suitably adjusted by screwing the bolt 32 in accordance with the adjustment between the shank 16 and the ram bolt 15 due to the outside diameter of the electric wire 40.

The nut 33 is applied to the thread portion 34 of the bolt 32 so as to secure the bolt 32 to the anvil holder 19 to keep the interval T.

In pressure-welding the electric wire 40 and the terminal metal fitting 4 by using the terminal pressure-welding apparatus 1, the applicator 10 is firstly installed according to the size of the terminal metal fitting 4 as a preparation work, and the interval between the crimper 13 and the anvil 12 of this the applicator 10 is adjusted to meet the outside diameter of the electric wire 40. At this time, the nut 27 is screwed on the shank 16 so as to secure the shank 16 and the ram bolt 15.

And, after the bolt 32 is screwed in the screw hole 31 with the interval T being between the interval D1 and the interval D2, the bolt 32 is secured to the anvil holder 19 by using the nut 33.

And, in pressure-welding the electric wire 40 and the terminal metal fitting 4 to each other, the terminal feed mechanism 17 feeds the terminal metal fitting 4 of the terminal bundle one by one on the anvil 12. As shown in FIG. 3, the electric wire 40 is put on the terminal metal fitting 4 positioned between the crimper 13 and the anvil 12.

The drive source 3 drives downward the crimper 13 through the shank 16 and the ram bolt 15. And, the terminal metal fitting 4 is separated from the terminal bundle. And then, as shown in FIG. 4, the crimper 13 and the anvil 12 bend or crimp the cramping pieces 7,8 of the terminal metal fitting 4 and the end portion of the electric wire 40.

According to the present embodiment, since the bolt 32 is attached to the anvil holder 19 in a state of the interval T being between the interval D1 and the interval D2, the terminal metal fitting 4 is securely pressure-welded to the electric wire 40 by means of the crimper 13 and the anvil 12.

Since the lower end plane 22 abuts against the end plane 35a just before the crimper 13 gets in contact with the anvil 12, the crimper 13 and the anvil 12 can be prevented from damage.

And, since the bolt 32 is secured to the anvil holder 19 with the nut 33, the interval T between the end plane 35a of the bolt 32 and the flat plane 23 of the anvil holder 19 can be kept constant, thereby securely preventing the crimper 13 and the anvil 12 from being damaged.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A terminal pressure-welding apparatus, comprising:

a first pattern;

a second pattern facing the first pattern, one of the first and second patterns being movable toward and away from the other of the first and second patterns, a mounting portion operative to fixedly mount the other of the first and second patterns;

a displacing member carrying the movable one of the first and second patterns and having means for moving the displacing member relatively to the mounting portion mounting the other of the first and second patterns for imparting welding pressure between the first and second patterns; and a stopping means to limit a position of abutment of the displacing member and the mounting member so that an abutment of the first and second patterns can be prevented, wherein, when a terminal metal fitting and an end portion of an electric wire are placed between the first and second patterns, the terminal metal fitting and the electric wire end portion are pressure-welded by effecting a required pressure force between the first and second patterns.

2. The terminal pressure-welding apparatus as set forth in claim 1, wherein the displacing member includes an end plane, and the stopping means has a projecting portion projecting from the mounting portion toward the displacing member and operative to abut against the end plane of the displacing member to check the abutment of the first and second patterns.

3. The terminal pressure-welding apparatus as set forth in claim 2, wherein the projecting portion has an abutting plane to abut against the end of the displacing member, means for adjusting a distance between the abutting plane and the mounting portion, and a fixing means for secure the projecting portion to the mounting portion for keeping the distance.

* * * * *